United States Patent
Wagner et al.

(10) Patent No.: US 7,159,085 B2
(45) Date of Patent: *Jan. 2, 2007

(54) METHOD OF ALLOWING POINT-IN-TIME VIEW OF DATA ON A DISK

(75) Inventors: Michael Paul Wagner, Raleigh, NC (US); Paul Thomas McGrath, Raleigh, NC (US); J. Brandon Myers, Durham, NC (US); Bruce Allen Keesee, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 623 days.

This patent is subject to a terminal disclaimer.

(21) Appl. No.: 10/126,711

(22) Filed: Apr. 19, 2002

(65) Prior Publication Data
US 2003/0197963 A1    Oct. 23, 2003

(51) Int. Cl.
*G06F 12/00* (2006.01)
(52) U.S. Cl. .................... 711/162; 707/204
(58) Field of Classification Search ........ 711/112–114, 711/161–162; 710/13, 20, 23, 54, 61, 65
See application file for complete search history.

(56) References Cited

U.S. PATENT DOCUMENTS

| | | | | |
|---|---|---|---|---|
| 5,623,541 A * | 4/1997 | Boyle et al. | ............ | 379/221.15 |
| 5,625,833 A * | 4/1997 | Levine et al. | ............... | 715/500 |
| 5,687,343 A * | 11/1997 | Fecteau et al. | ............. | 711/202 |
| 6,035,415 A * | 3/2000 | Fleming | ...................... | 714/11 |
| 6,243,795 B1 * | 6/2001 | Yang et al. | .................. | 711/159 |
| 6,594,744 B1 * | 7/2003 | Humlicek et al. | .......... | 711/162 |
| 6,633,724 B1 * | 10/2003 | Hasegawa et al. | .......... | 386/113 |
| 6,775,790 B1 * | 8/2004 | Reuter et al. | ................... | 714/5 |
| 2003/0005248 A1* | 1/2003 | Selkirk et al. | .............. | 711/165 |
| 2004/0078636 A1* | 4/2004 | Suzaki | .......................... | 714/6 |

OTHER PUBLICATIONS

Microsoft Computer Dictionary.*

* cited by examiner

*Primary Examiner*—Brian R. Peugh
*Assistant Examiner*—Hashem Farrokh
(74) *Attorney, Agent, or Firm*—A. Jose Cortina; R. Kevin Perkins; Daniels Daniels & Verdonik, P.A.

(57) ABSTRACT

A method allows point-in-time viewing of session data for multiple sessions being stored on a disk. Session bits are set for the session data in memory which points to the data at any particular point in time, and this can be done for multiple sessions. In order to make the session data persistent, separate session bits are stored in a portion of a disk reserved for such session bits. Thus, in the event of failure where session bits which are stored in volatile memory such as RAM, are lost, the duplicate copy set in the non-volatile memory can be used to recreate the session once the failure is corrected.

14 Claims, 6 Drawing Sheets

METHOD OF ALLOWING POINT-IN-TIME VIEW OF DATA ON A DISK

FIELD OF THE INVENTION

This invention relates to a method of creating a point-in-time copy of data on a disk, i.e., a Logical Unit, which is accessible from a different host. More specifically, the invention allows views of multiple point-in-time copies in a manner in which access to such point-in-time copies is maintained notwithstanding multiple failures such as failure of a processor, a reboot operation, power failure, etc.

BACKGROUND OF THE INVENTION

In current storage environments or systems, such as block storage systems, it is often the case that such environments or systems will include one or more hosts, such as a server, for example, such as is available from Sun Microsystems and/or other companies. Such hosts are typically attached through network connections, such as a fibre channel, to one or more storage units or arrays. Such storage units or arrays are typically configured as a cabinet including multiple storage disk drives, and onboard intelligence in the form of one or more processors which operate to control the storage unit. Examples of such storage units are those available from EMC Corporation, for example, under the product name Clariion™.

In such environments, multiple input-output (I/O) operations occur due to users working through one or more hosts to read and write data to disks in the storage unit.

The read and write operations correspond to what are generally referred to as individual sessions. For example, a session might involve storing of ticket purchase orders for a concert or other event which occurred beginning at 9:00 a.m. on a Tuesday, and ending at 1:00 p.m. on the same day.

For general backup processing, it is desirable to be able to view all the data for a particular session from a separate host, for example, to support offloading of the backup processing from the host processing the application. However, it becomes difficult to track the data because subsequent sessions by the host which initiated the first session will often change the configuration of the disk, and the way data is stored thereon in a manner such that it becomes impossible to view and access data for a prior session.

One current product currently available from EMC Corporation under the aforementioned Clariion™ name currently supports the ability to view data for a single active session on a disk. Although such a device supports a single session, it is often the case that a host would want to run multiple sessions concurrently. For example, in the aforementioned example concerning ticket sales, the first session may have started at 9:00 a.m., but a user at the host also knows that tickets for a particular and very popular event are due to begin sales at 10:00 a.m. In such a case, it is desirable to run a second session while continuing to run the first session for sales of all tickets from 9:00 a.m. to 1:00 p.m. so as to be able to gather information about which ticket sales were directly attributable to the popular event, and sales for which began at 10:00 a.m. The existing system is incapable of allowing views of multiple sessions. Further, in the event of failure such as the loss of power, etc., the session data will be lost and the session must be manually restarted when the failure has been corrected.

In accordance with the invention, the problem of current systems which support only a single session, and are not able to provide protection against a single point of failure, e.g., SP crash, power failure, etc.

SUMMARY OF THE INVENTION

In one aspect, there is described a method of allowing point-in-time views of data on a disk. The method involves initiating from a host, a first session of writing data to a disk which affects a portion of the disk. A map entry is created and stored, which contains a session bit, indicative of which portion of the disk for the first session was affected by a write operation, and where data corresponding to the first session is stored on the disk. A second session is initiated at a time different from the initiation of this first session, and the second session also affects a portion of the disk. The data on any portion of the disk, for example, data corresponding to the first session, which is to be affected by a write operation corresponding to the second session, is copied, and there is created and stored a map entry, which contains a session bit, indicative of where the data which has been copied corresponding to the first session, resides. Through access to the bits which have been created and stored, a second host can then access the data corresponding to the various sessions, because through use of the session bits, the second host then knows where the data corresponding for each session resides on disk.

In one aspect, the bits are stored in volatile memory such as random access memory (RAM). In a more specific implementation, a second copy is made in persistent storage, for example in a dedicated portion of the disk constituting a map, such that, for example, in the event of a power failure, while the session bit may be lost in RAM, it can be recreated by copying from the corresponding entry in the dedicated portion of the disk, i.e., persistent storage. This implementation where the session bits are also stored in persistent storage can be used in support of multiple sessions as described herein, or, for example, with the prior art system which supports only single sessions, and wherein that single session can be recovered even in the event of a failure such as a power failure.

In a yet still further aspect, it is often the case that when a second host needs to access session data for one or more sessions, under certain operating environments, the host must first initiate a write operation. If that write operation occurs, then session data which the second host wishes to access may be affected. To avoid these problems, a duplicate entry, i.e., a session bit for a particular session, is made and the data for that session is also copied to allow the host to perform its write operation and view the session data without affecting the original stored session data. The host can then perform whatever backup operations are required, terminate the operations, and the original data for one or more sessions remains unaffected.

BRIEF DESCRIPTION OF THE DRAWINGS

Having thus briefly described the invention, the same will become better understood from the appended drawings, wherein.

DETAILED DISCUSSION

To facilitate understanding of this invention, the following terms are set forth as defined terms, which will then facilitate an understanding of the method described herein.

Chunk Map Entry: This refers to a structure used to indicate what chunks have had COFW operations performed. These entries are stored in a hash table for fast lookup. Their existence indicates that a COFW operation has occurred and there is data in the View Cache.

Chunk Size: This is the unit of measure used to improve performance. Instead of storing individual blocks in the View Cache and keeping internal management information about each individual block, an operating system driver will use multiple blocks (Chunk Size). All COFW (defined below) I/O is done in Chunk Sized I/Os. The default Chunk Size us 64 KB and is user configurable in selectable sizes of 16 KB, 32 KB, 64 KB, 128 KB, and 256 KB.

Copy on First Write (COFW): This is an implementation that ensures the original version of Source LU data is saved before being modified. Before the first modification, and after the start of a View Session, the original data on the Source LU will be read and stored in the View Cache. This only applies to the first modification of the data. Overwrite of any data that has already had a COFW does not require any extra processing since the original data was previously saved in the View Cache.

Gaggle: This is a structure used to combine cache device usage and Chunk Map Entries so that memory usage and flushing of persistent information is as optimal as possible. Conventional definitions define a gaggle as a "flock of geese." In usage herein it symbolizes a "flock of chunk entries."

Logical Unit: A Logical Unit is one or more disk modules bound into a single entity, accessible by Logical Unit number, a hexadecimal number that becomes part of the disk unit device name.

Session LU: A phantom Logical Unit associated with a Source LU. The Session LU is created (not bound like a traditional LU) via, for example, through programming of the array, for the purpose of accessing a session of a Source LU from a connected host. The Session LU appears "offline" until a session is started on the associated Source LU and activated on the Session LU.

Source Logical Unit: A Logical Unit (LU) is one or more disk modules bound into a single entity. An LU is accessible to connected hosts by a Logical Unit number, a hexadecimal number that becomes part of the disk unit device name. A Source LU is an LU that contains real user data and has an associated Session LU defined for it.

View Cache: This refers to disk storage used to hold the original data from a Source LU that has been modified since the start of a View Session. This storage is pre-allocated and used exclusively for such purposes. The View Cache can consist of multiple Logical Units; the Logical Units are then managed as a pool of space. For each storage processor, this feature allows independent, different sized, View Caches to be defined.

View Session: A View Session starts when a snapshot is taken (not when the snapshot is created through the program) of a Source LU. A snapshot can be taken through programming on the storage array. A View Session can be scripted from a host. The View Session can be stopped in a similar manner when the Session LU is no longer of any use. There is only one active session on a Session LU at any given time. There can be many concurrent active sessions, on different Session LUs, bound by the array memory resources allotted to the feature.

Figure 1:
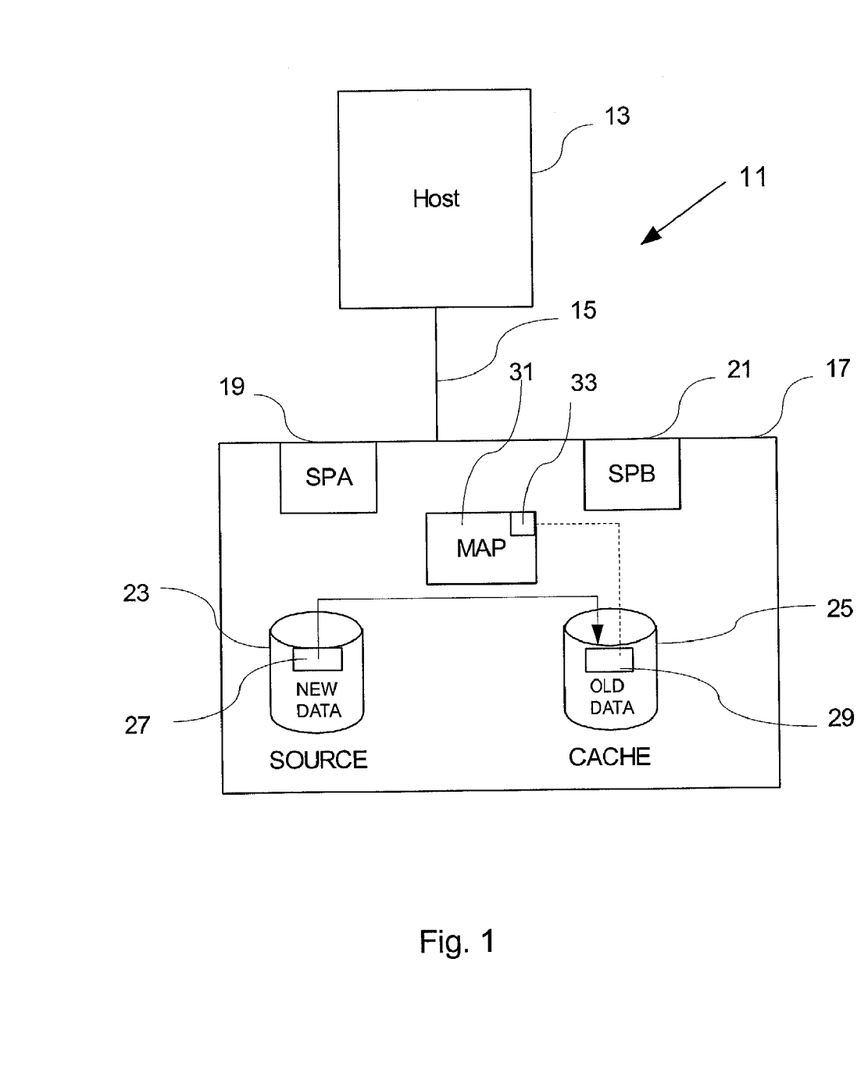
FIG. 1 is a block diagram illustrating a host attached through a fibre channel switch to a storage array, having multiple disks contained therein.
Figure 2:
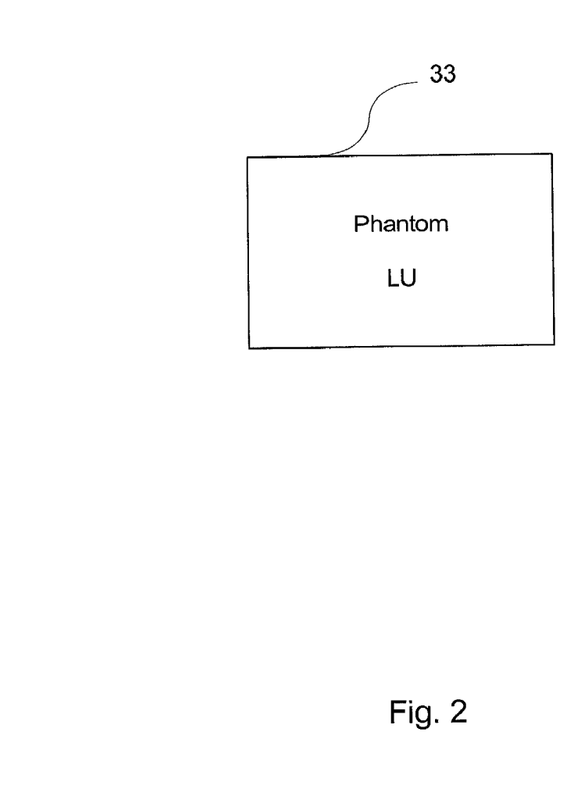
FIG. 2 is a block diagram illustrating a portion of FIG. 1 as a phantom Logical Unit in which session bits are used to determine which data to present.

FIG. 1 illustrates a typical arrangement in which a host 13 is connected in a network 11 through a fibre channel connection 15, to a storage array unit 17 having storage processors 19 and 21 and at least two storage disks 23 and 25. A map 31 of where data resides is also stored, for example, in memory such as Random Access Memory. The map includes chunk map entry 33 which include, as illustrated in FIG. 2, phantom Logical Units (LUs) as well as other data/bits mapping COFW data from disk 23 to disk 25.

As illustrated, a session may be initiated by a host 13 and new data 27 is entered into a source disk 23. Prior to new data 27 being entered for a session which would affect old data, the old data is copied over to a cache disk 25 and a session bit is set at this chunk map entry 33 with a pointer to where the old data 29 for the session resides in the cache disk 25.

Figure 3:
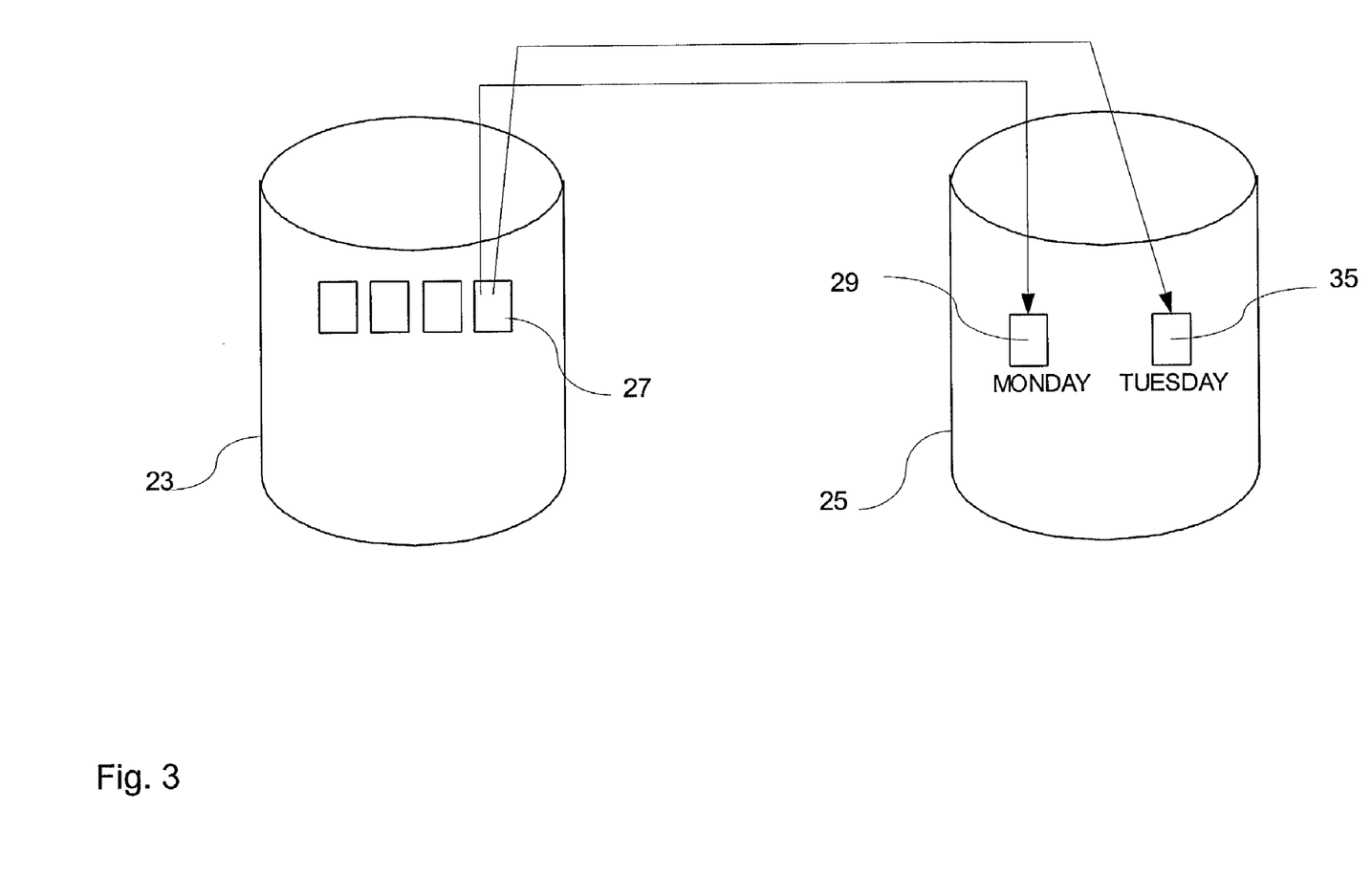
FIG. 3 is a block diagram illustrating how multiple sessions are stored on a cache disk from a source disk as sessions are accessed by a host.

As illustrated in FIG. 3, the method described herein supports multiple sessions, thus, as new data 27 is to be entered, old data, for example for two sessions, is copied over into two different regions of the cache disk 25, for example, a first region 29 for Monday data, and a second region 35 for Tuesday data so that that data can be preserved and viewed, for example through a second host performing backend processing.

Session bit usage can optimize cases where data was not modified during the "Monday" session but does get modified after the "Tuesday" session has been created. In this case a single copy of the data is stored in the View Cache and a single chunk map entry is created that contains session bits indicating that for either the "Monday" or "Tuesday" sessions, this data is in one place. This is illustrated in the discussion hereafter.

Figure 4:
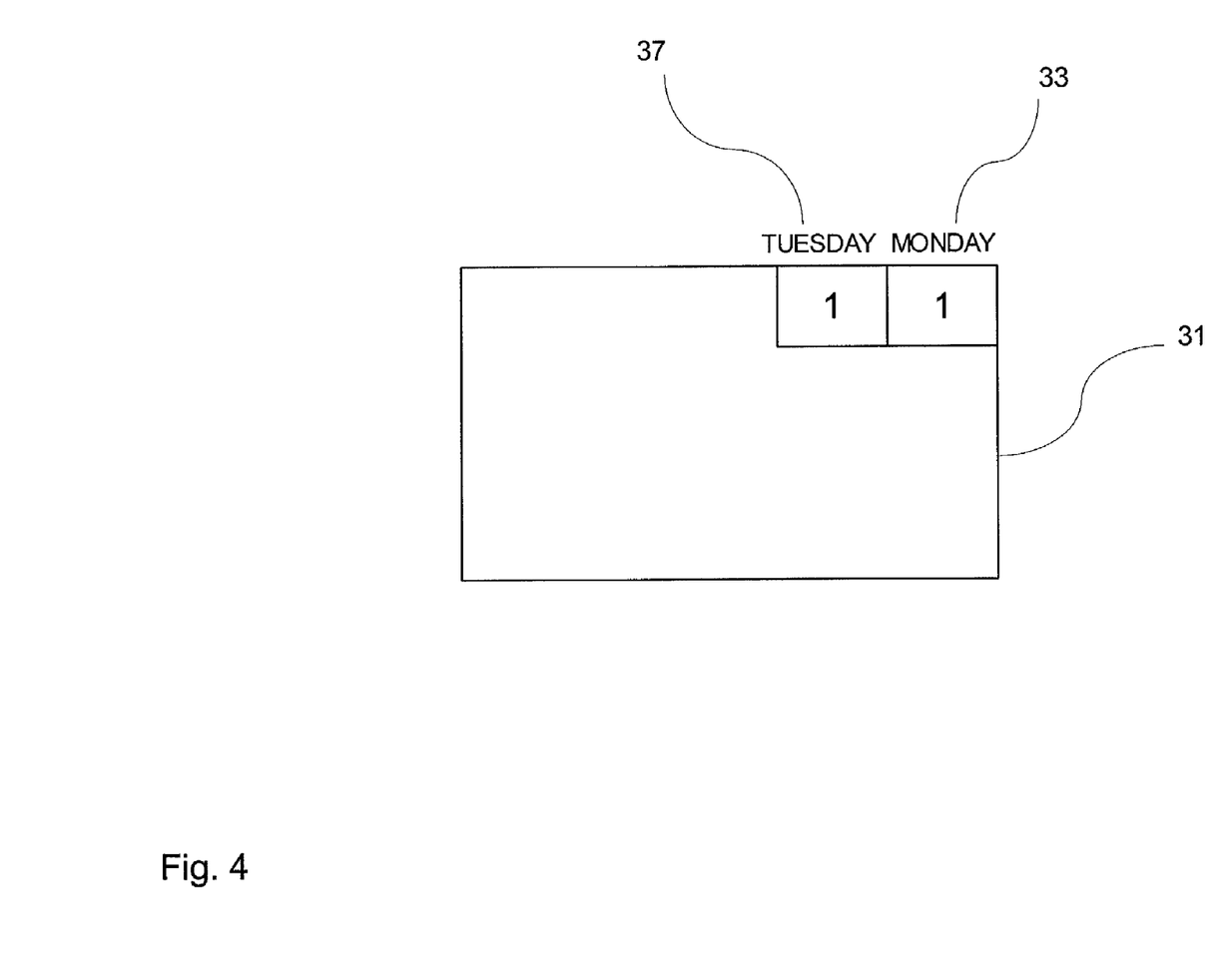
FIG. 4 illustrates a Logical Unit illustrating how session bits are set for different sessions so that multiple sessions can be accessed by a second host.

FIG. 4 illustrates a chunk map 31 in which two areas are reserved for setting session bits for the different sessions. For example, the chunk map entry containing session bit 33 can be set for Monday pointing to where in the cache disk the old data for the Monday session resides, and the chunk map entry containing session bit 37 can be set to point to where in the cache disk the session data for the Tuesday session resides.

Figure 5:
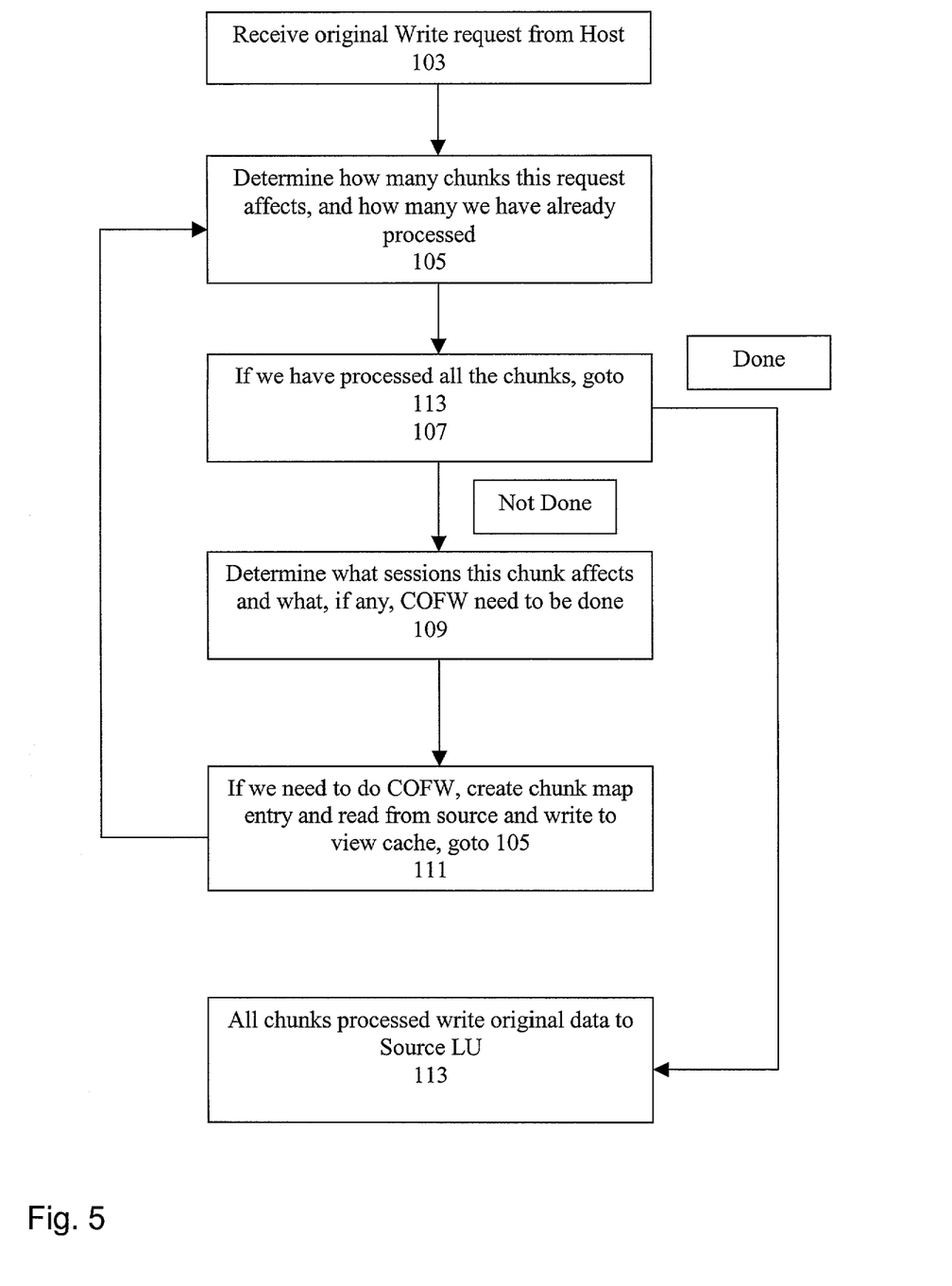
FIG. 5 is a flow chart illustrating the operation of how multiple sessions can be stored and access to multiple sessions by a second host maintained.

To further describe the operation, FIG. 5 is a flow chart 101 which shows how multiple sessions are supported.

An initial session is started at step 103 where data is written to disk, for example, source disk 23. At step 105 the request is analyzed to determine how many chunks are affected and how many we have already processed. At step 107 we look to see if we have processed all of the chunks affected, if so we go to step 113 and write the original data to the source LU. If we have not processed all of the chunks we move to step 109 where we create the chunk map entry with the correct session bits set and perform the COFW operations, copying the old data from the source LU to the cache disk 25. We then return to step 105 to reevaluate the work left to do.

Figure 6:
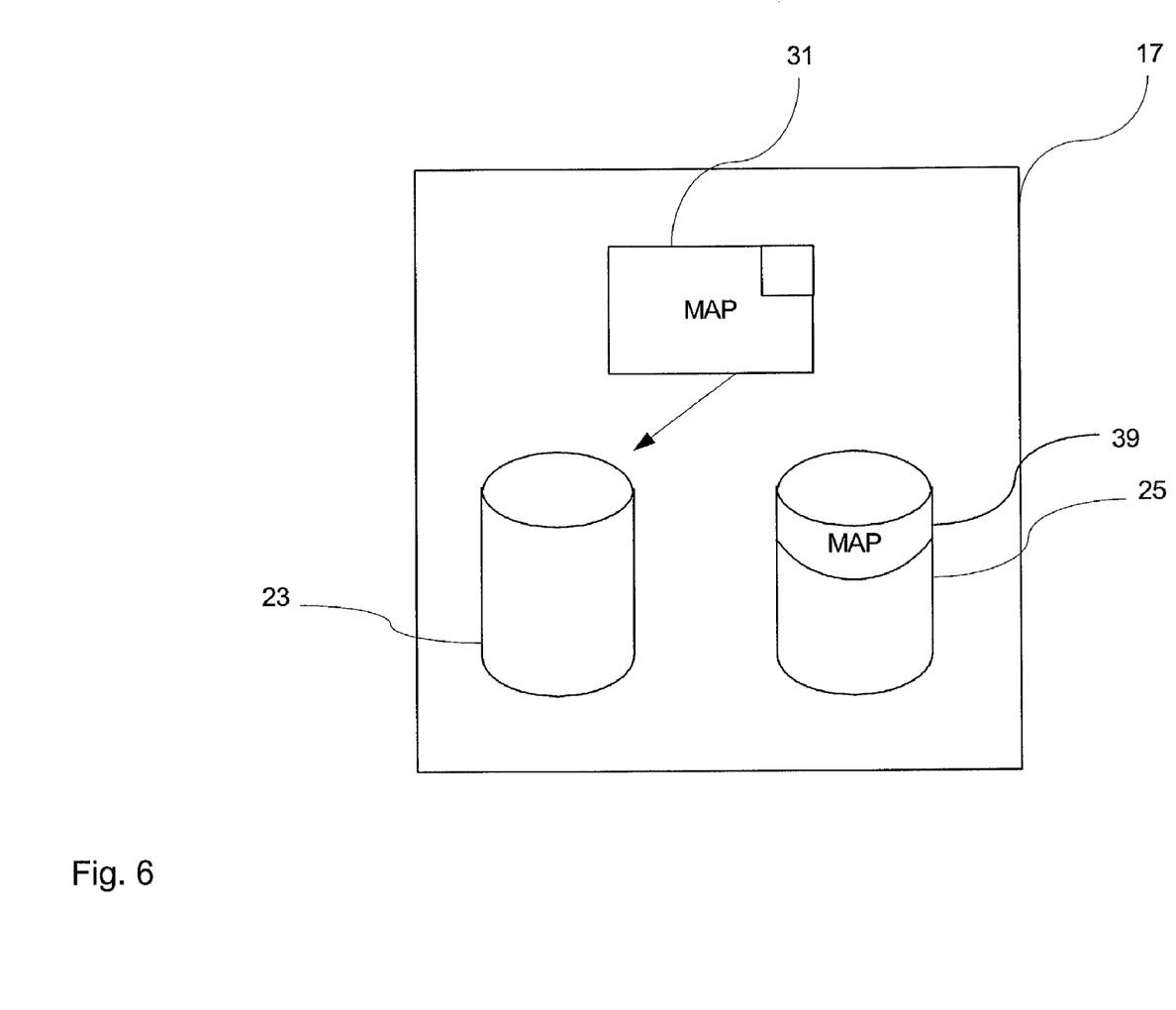
FIG. 6 is a block diagram illustrating how a portion of a disk is reserved for purposes of maintaining a copy of session bits so that in the event of a failure, access to the sessions can be recovered without having to manually restart the system.

FIG. 6 illustrates how the data can be made persistent. By the term "persistent" is meant that access to the data can be automatically recovered after a failure such as a power failure, processor failure, etc. More specifically, in the event of a storage processor failure or rebooting, an array failure or reboot, or a host I/O trespass from one storage processor to the other, it is possible that the chunk map entry or session bits corresponding to the data, particularly old data for a session may be lost. The reason for this is because the session bits are typically stored in volatile memory such as RAM. As illustrated in FIG. 6, it is possible to make the sessions persistent without requiring manual restarting of the session by reserving a portion 39 of the cache disk 25 in which a copy of each session bit is made for particular sessions. In such a case, it is possible to make the sessions persistent.

More specifically, when sessions terminate as a result of one of the previously-mentioned conditions, all COFW information is lost, thus causing the point-in-time view of the data to be lost. Thus, by reserving a portion 39 of a disk, it is possible to know what data has already had COFW done for a session, and where in the cache disk 25 the data resides. Thus, at the time a session is started, the cache device will be assigned to the Source LU for the purposes of persistently storing map entries associated with any COFWs that have occurred in any of the persistent sessions on the Source LU.

In accordance with the invention, decisions about whether all sessions are made persistent can be made depending on resource allocation and not all sessions need to be made persistent and thus, the amount of storage area reserved for the map 39 can be most effectively manipulated.

Thus in a specific implementation, a user can send a start session command indicating that the session data is to be made persistent. The device driver looks for a cache device that is not in use and if it does not find one, returns an error. If a cache device is found, it assigns it to the Source LU that the session is being started on. The driver using the current Chunk Size value computes how much COFW data can reside on the cache device and then determines how many Gaggles are required to manage the COFW space. At this point, the cache device is initialized with information indicating there is a session started and that there are no active Gaggles. This will result in the flushing of the cache map header to the cache device. At this point, the offset where COFW data can be written to is established and the session is ready for COFW processing.

The basic methodology for processing persistent COFW operation is as follows:

The write request is analyzed to determine what if any COFW processing needs to be done for the request. If there is none required, the request is passed on. For each new COFW operation, a Chunk Map Entry is performed. Available chunks are found in Gaggles mapped to memory. If this succeeds, the Gaggles are flushed to the cache device. COFW processing then continues in a conventional manner, and when the COFW data is written to the cache device, the Chunk Map Entry is updated and the Gaggle the Chunk Map Entry resides in is flushed to the cache device. When the last COFW operation is complete, the original write is passed on.

In implementing this feature, if there is not enough Gaggle space to assign Chunk Map Entries, it is determined whether another Gaggle can be created for the cache device. If there are already the maximum number of Gaggles for the particular cache device, then a search is conducted for another free cache device to keep the session persistent. Failure to do so terminates the session.

The following table illustrates current COFW operations as compared to persistent COFW I/O operations.

| Current COFW I/O Operations | Persistent COFW I/O Operations |
| --- | --- |
| Read old data | Read old data |
| Write old data | Write old data |
| Pass on original write request | Write updated Gaggle (Chunk in cache) |
| | Pass on original write request |

The following describes how the cache map area is implemented.

The cache map area as shown as 39 in FIG. 6 is the heart of persistence. The cache map area is the area at the beginning of each cache device that has been assigned to a Source LU for the purposes of storing persistent information. The size of this area is calculated based on the size of the cache device, and the current Chunk Size value. Once we know the size of the cache device we can figure out how many chunks can fit on the device. Knowing this allows us to calculate how many Gaggle structures are required to manage the chunks for this cache device. Once this is known we now have the map area and the starting offset to write COFW data.

The cache map area is made up of two structures. The first structure is a SC_GAGGLE_HEADER structure which contains all of the information about sessions that this Source LU is a part of. This structure is always the first one on each cache device.

The SC_GAGGLE_HEADER is 8 kb in size to preserve alignment with the SC_GAGGLE structure defined below. This will allow for all of the current session and cache linkage information to be stored and provide for growth to 16 sessions per device.

The second structure is the SC_GAGGLE. This structure contains the bitmap and Chunk Map Entries for a portion of the cache device. The Gaggle is designed to be 8 kb in size and has the following definition:

```
typedef struct_SC_GAGGLE
{
    //
    // A signature, replicated at the end of the Gaggle to detect Partial Writes.
    // The signatures are incremented together. When reading in a Gaggle, if the two Signatures
    // do not match, we may have a partial Gaggle Write.
    //
```

-continued

```
    ULONG                               GaggleSignature;
    //
    // Version of this structure.
    //
    ULONG                               Version;
    //
    // Link to Gaggle Header Gaggle List
    //
    LIST_ENTRY                          GagglesListEntry;
    //
    // Used to put Gaggle on various queues during Stop Sessions Processing
    //
    LIST_ENTRY                          ModifiedGagglesListEntry;
    //
    // Back pointer to the Cache that contains this Gaggle
    //
    struct_SC_CACHE_LIST_ENTRY          *PCache;
    //
    // Which Gaggle is this?
    //
    ULONG                               GaggleId;
    //
    // Lock to protect allocation/deallocation of chunks
    //
    KSPIN_LOCK                          GaggleLock;
    //
    // A Session Pattern for all Chunk Entries in this Gaggle
    //
    UCHAR                               SessionPattern;
#if defined( ROLLBACK_ON) || 1
    //
    //    padding for future use
    //
    UCHAR                               Padding1;
    UCHAR                               Padding2;
    //
    //    Indicates whether this gaggle is dirty and needs to be written to disk
    //
    BOOLEAN                             NeedsFlushing;
#endif
    //
    // The Chunk Map Entry Warehouse
    //
    K10_MISC_UTIL_MEMORY_WAREHOUSE      ChunkMapEntryWarehouse;
} SC_GAGGLE, *PSC_GAGGLE;
```

The Gaggle plays a very important role in persistence. It is the structure that allows all of the vital information about active Chunk Map Entries on a device to be stored for retrieval in the event a failure occurs that results in the need to move the session to the other storage processor 19 or 21 or continue it after a reboot.

The Gaggle combines two important functions the first is the bitmap of chunks in the cache device. This map is used to determine whether or not there is sufficient space for the COFW data. Combining this with the actual Chunk Map Entries that are assigned to the chunk allows us to update both elements and flush a single request to the cache map area.

Thus as implemented, when a failure occurs when storage processor 19 or 21 is rebooted, attached hosts will attempt to access an alternate path to the array 17. If in fact one SP 19 or 21 is still up this will result in a trespass of the Source LU and its Session LU, then the driver will open the cache devices that are assigned to the Source LU. The trespass will cause a TRESPASS command to come to the device and the driver will begin the process of accessing the cache device to read its gaggle information to determine how to rebuild the map for this source LU. During the recovery process we need to return DEVICE BUSY until the map is rebuilt.

The SC_GAGGLE_HEADER structure will be read in and processed. This consists of setting up any session information in memory and on the local device extension for the sessions active on this Source Lu.

Once this is done, the gaggles will be read and processed. Processing of the gaggles involves figuring out which chunk map entries are valid and part of sessions that are persistent. If the chunk map entry is not a member of a persistent session it will be freed up. A chunk map entry for a non-persistent session ends up in the cache map area because the non persistent sessions still use gaggle space. Therefore if non-persistent session "foo" utilizes chunk entry 6 and then persistent session "bar" comes along and utilizes chunk entry 7, when the persistent session causes this gaggle to be flushed, chunk entry 6 contains valid data but it is for a non persistent session. The rebuild needs to reclaim this space. If any of the sessions for the Source Lu are persistent the gaggle will be flushed to the cache map area. It will only be flushed when modifications to chunk entries in persistent sessions occur, but the gaggle will also contain information about non-persistent chunks.

For those chunks that are in a persistent session, the chunk map entries will be rehashed into the Source Lu's hash table.

While the driver is rebuilding the hash table of chunk map entries, I/O requests to the Source Lu and SCLUN(s) will be rejected with device busy status codes.

Having described persistence in detail, further details about the support of multiple sessions are provided hereafter with respect to its specific implementation as already generally described with reference to FIGS. 1–5. More specifically, the method accommodates multiple concurrent sessions on the same Source LU. This functionality allows users to create multiple point in time views of the Source LU. In a user configurable option, it may be desirable, but not mandatory, to allow up to eight concurrent sessions per four active sessions because it was a new COFW for the chunk for each session. This consumes 4 times the memory and creates problems with usage counts of the actual COFW data in the cache.

To solve this, in accordance with the invention, a new field is created for Chunk Map Entries that indicates what sessions this entry pertains so. This field is a single character for which the 8 bits are used as indicators of the sessions the chunk is participating in.

The following example will help illustrate how the method can efficiently manage multiple sessions with these new fields.

```
Time 0:  no active sessions
         SessionPattern:   0    0    0    0    0    0    0    0
         Sessions:       Null Null Null Null Null Null Null Null
Time 1:  Start session "Foobar"
         SessionPattern:   1    0    0    0    0    0    0    0
         Sessions:        ptr Null Null Null Null Null Null Null
Time 2:  Modify, Block 100
         Call to LinearHashRetrievePattern( ) returns                 0 0 0 0 0 0 0 0
         We then XOR this value with the current SessionPattern of   1 0 0 0 0 0 0 0
         Result is                                                    1 0 0 0 0 0 0 0
         Since result is non zero we know we have to create a chunk entry and assign it the
         resulting pattern
Time 3:  Modify Block 1000
         Call to LinearHashRetrievePattern( ) returns                 0 0 0 0 0 0 0 0
         We then XOR this value with the current SessionPattern of   1 0 0 0 0 0 0 0
         Result is                                                    1 0 0 0 0 0 0 0
         Since result is non zero we know we have to create a chunk entry and assign it the
         resulting pattern
Time 4:  Start session "NotAFooBarSession"
         SessionPattern:   1    1    0    0    0    0    0    0
         Sessions:        ptr  ptr Null Null Null Null Null Null
Time 5:  Modify Block 100
         Call to LinearHashRetrievePattern( ) return                  1 0 0 0 0 0 0 0
         We then XOR this value with the current SessionPattern of   1 1 0 0 0 0 0 0
         Result is                                                    0 1 0 0 0 0 0 0
         Since result is non zero we know we have to create a chunk entry and assign it the
         resulting pattern
Time 6:  Modify Block 5000
         Call to LinearHashRetrievePatter( ) returns                  0 0 0 0 0 0 0 0
         We then XOR this value with the current SessionPattern of   1 1 0 0 0 0 0 0
         Result is                                                    1 1 0 0 0 0 0 0
         Since the result is non zero we know we have to create a chunk entry and assign it the
         resulting pattern
Time 7:  Modify Block 100
         Call to LinearHashRetrivePattern( ) returns                  1 1 0 0 0 0 0 0
         We then XOR this value with the current SessionPattern of   1 1 0 0 0 0 0 0
         Result is                                                    0 0 0 0 0 0 0 0
         Since the result is zero we know there are no COFWs to perform
```

Source LU. It is important to note here that even though there are allowed up to eight sessions per Source LU, in this implementation, there is typically only 80 MB of memory to manage map entries and thus extensive modifications and multiple sessions could exhaust the budget and cause sessions to terminate.

In an effort to ease the administration of multiple sessions, a user can create a single Session LU and then as needed, decides which session should be presented by this Session LU.

In implementing multiple sessions memory budget is considered and how it would be affected with up to eight active sessions per Source LU. One optimization is implemented with respect to COFW operations that were affecting multiple sessions for the first time. For example, if there were four active sessions and no block in the chunk that contains block 500 was created, and a write to block 500 came in, the Chunk Map Entry was modified for each of the When sessions stop the chunk entry with the bit set in the position of the session that is being stopped is found, and the bit is reset to zero. If this results in the SessionPattern being all zeroes, then the chunk entry and associated cache position can be freed up. If the SessionPattern is not all zeroes, then we know that other session(s) are referencing the chunk and the associated COFW data.

Figure 7:
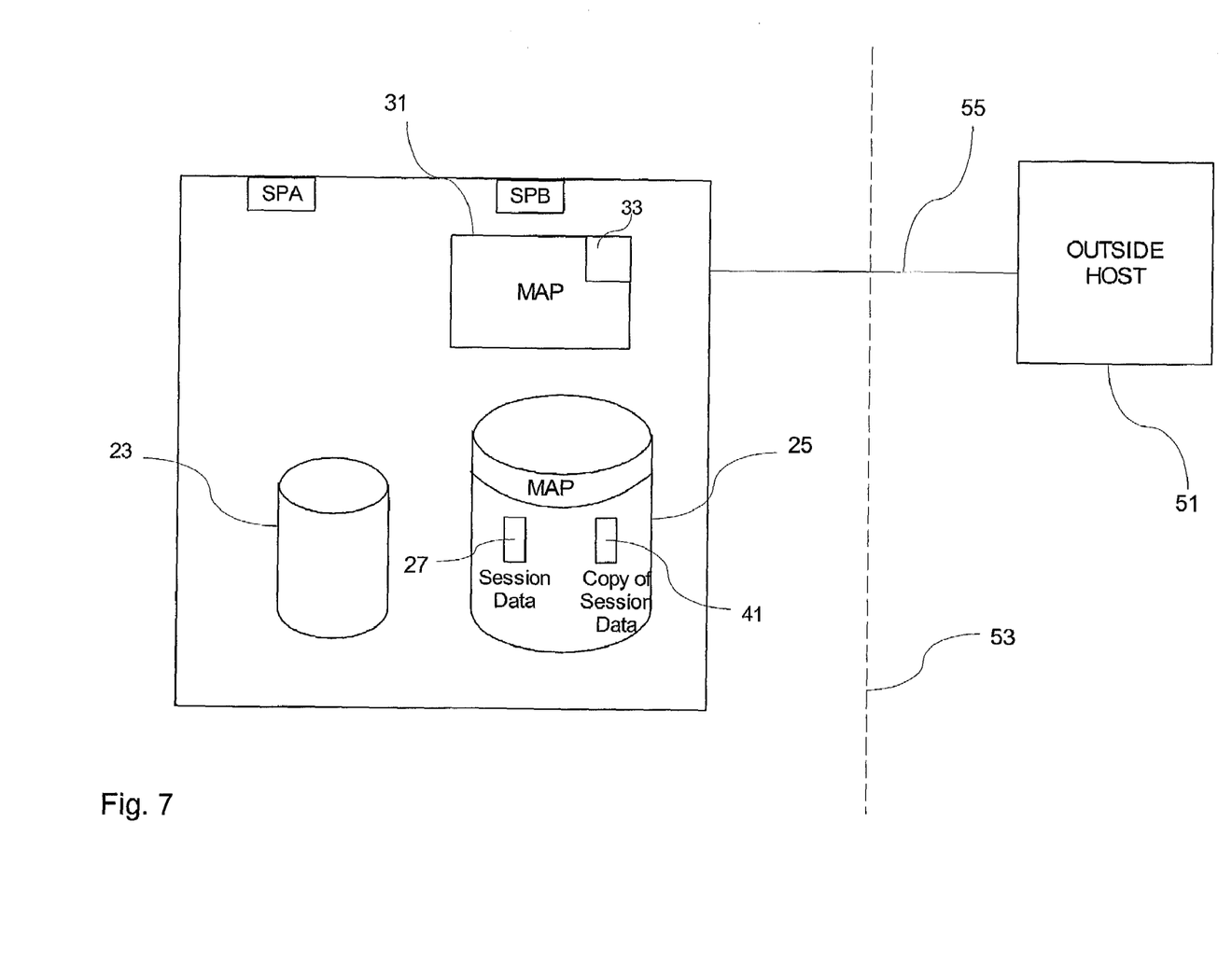
FIG. 7 is a block diagram illustrating how a copy of session data is made to allow a second host to access that data without affecting the original session data for a particular session.

Having thus described persistence and multiple session implementations in greater detail, a yet still further aspect of the method described herein is illustrated in FIG. 7. More specifically, sometimes when a second host 51 wishes to look at a Session LU, certain operating systems require that a write to the disk has to occur. For example, the Windows™ operating system available from Microsoft Corporation requires writing of a signature. So a write operation is required to be granted access. In order to ensure that session data is unaffected by such a write, an outside host 51 writes to the Session LU which causes the driver to created two copies of the chunk affected by the write request. The second copy is marked with a bit indicating it was generated by a write to the Session LU. The users data is then written into the second copy on the cache device. In this manner, the second host 51 is allowed access to session data, and is allowed to work with the session data, and once operations are terminated, the outside host can discontinue all write and read operations and the original session data remains the same and the LU to the copy of the session data disappears.

Having thus generally described the invention, the same will become better understood from the appended claims, in which it is set forth in a non-limiting manner.

What is claimed is:

1. A method of allowing point-in-time view of data on a disk, comprising:
    initiating from a first host, a first session of writing data to a disk which affects a portion of the disk;
    creating and storing the entry indicative of which portion of the disk for said first session was affected by a write operation, and where data corresponding to said first session writing operation is stored on the disk;
    initiating and controlling from the first host at least one second session of writing data to a disk at a time different from initiation of the first session, with said at least one second session of writing data affecting a portion of the disk;
    copying data in any portion of the disk corresponding to said first session which is to be affected by a write operation by said at least one second session;
    creating and storing entries indicative of where the data for said first session to be affected by the write operation is located, and creating and storing entries indicative of which portion of the disk for said at least one second session was affected by the write operation, and where data corresponding to said at least one second session writing operation is stored on the disk; and
    conducting point-in-time viewing of the disk from a second host wherein only the second host can access the entries indicative of data corresponding to each session, to view prior session data.

2. The method of claim 1, wherein said data affected by said at least one second session write operation is copied from a source disk to be stored at a cache disk.

3. The method of claim 1, wherein said entries indicative of which portions of disk are affected and where data is stored for each session, are created and stored in volatile memory.

4. The method of claim 1, wherein said entries which are created and stored to identify sessions and locations of data for each session, are made for multiple sessions, at least two of which were started at different times, but run concurrently, whereby all the data corresponding to each respective session can be accessed and viewed.

5. The method of claim 1, wherein said entries indicative of which portions of disk are affected and where data is stored for each session, are created and stored in volatile memory, and a separate corresponding entry for each one of said entries is created and stored in persistent storage.

6. The method of claim 1, further comprising creating and storing a second entry of which portions of disk for respective sessions are affected by a write operation, and where data corresponding to each session writing operation is stored on the disk, and accessing the second entry with a second host to allow the second host a view of data for any session at any point in time.

7. The method of claim 6, further comprising making a copy of data corresponding to said second entry and allowing said second host to operate on said copy of said data.

8. A method of allowing point-in-time views of data on a disk, comprising:
    initiating and controlling from a first host, a session of writing data to a disk which affects a portion of the disk;
    creating and storing an entry indicative of which portion of the disk for said session was affected by a write operation, and where data corresponding to said first session writing operation is stored on the disk, and said creating and storing of said entry being done in volatile memory, and a separate corresponding entry being stored in persistent storage; and
    conducting point-in-time viewing of the data on the disk from a second host wherein only the second host can access the entries indicative of data corresponding to the session to view prior session data.

9. The method of claim 8, wherein said data affected by said session write operation is copied from a source disk to be stored at a cache disk.

10. The method of claim 8, further comprising creating and storing a second entry of which portions of disk for respective sessions are affected by a write operation, and where data corresponding to each session writing operation is stored on the disk, accessing the second entry with a second host to allow the second host a view of data for any session at any point in time.

11. The method of claim 10, further comprising making a copy of data corresponding to said second entry and allowing said second host to operate on said copy of said data.

12. A method of allowing point-in-time view of data on a disk, comprising:
    initiating from a first host, a session of writing data to a disk which affects a portion of the disk;
    creating and storing a first entry indicative of which portion of the disk for said session was affected by a write operation and where data corresponding to said session writing operation is stored on the disk;
    creating and storing a second entry corresponding to said first entry for allowing only a second host to perform point-in-time viewing of data for the session to view prior session data; and
    making a copy of data corresponding to said second entry and allowing only said second host to operate on said copy of said data.

13. The method of claim 12, wherein said first and second entries are created and stored in volatile memory.

14. The method of claim 13, wherein said first and second entries are also created and stored in persistent storage.

* * * * *